June 10, 1941.   P. G. HUGH ET AL   2,245,542
TRACTOR ROAD VEHICLE
Filed May 23. 1939   3 Sheets-Sheet 1

INVENTORS
P. G. HUGH
H. T. BAKER.

BY Rayner rb

ATTORNEYS

June 10, 1941.  P. G. HUGH ET AL  2,245,542
TRACTOR ROAD VEHICLE
Filed May 23, 1939   3 Sheets-Sheet 2

INVENTORS
P. G. HUGH
H. T. BAKER
BY
Rayner
ATTORNEYS

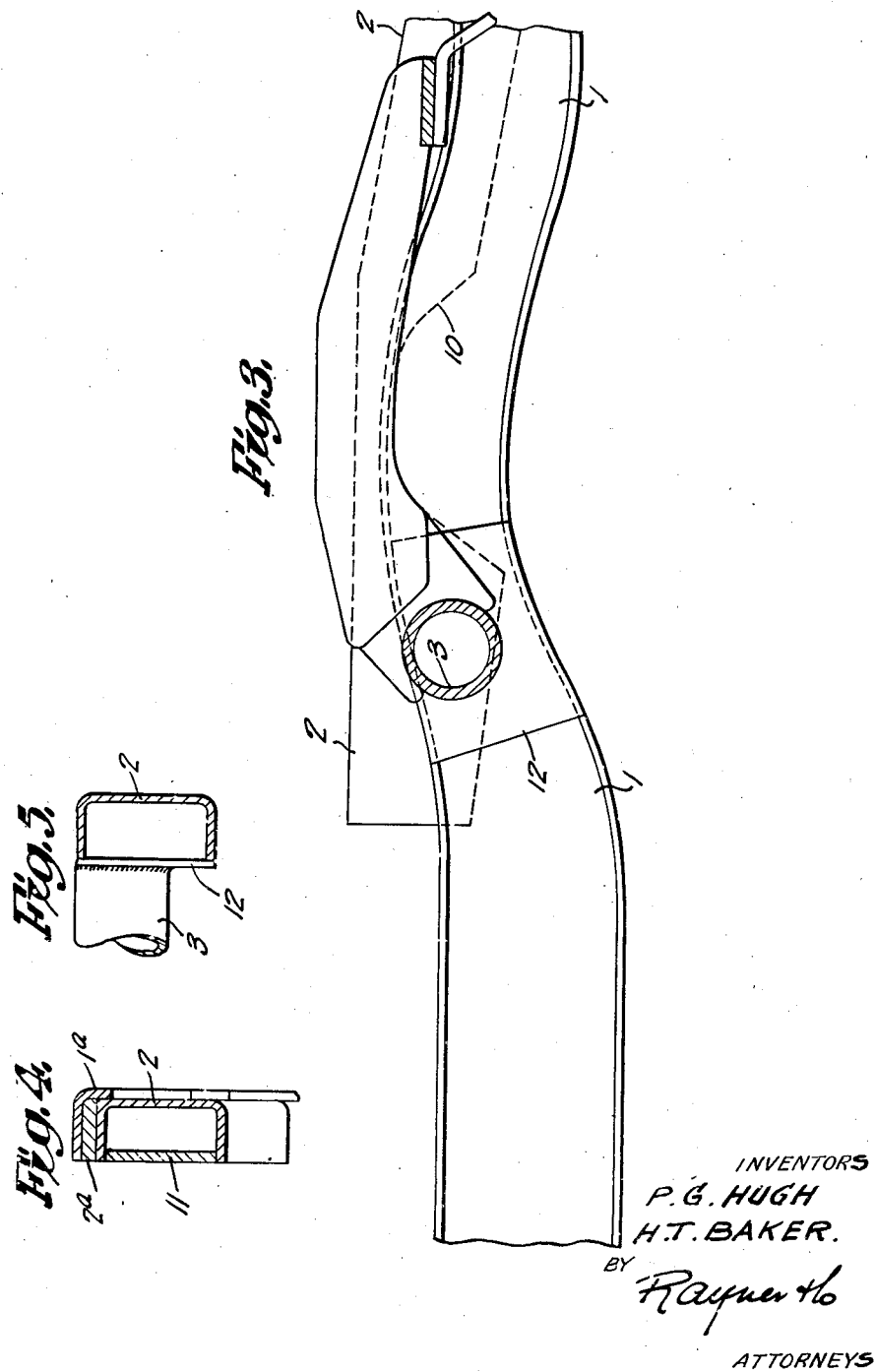

Patented June 10, 1941

2,245,542

UNITED STATES PATENT OFFICE 2,245,542

TRACTOR ROAD VEHICLE

Percy Garibaldi Hugh and Henry Thornton Baker, Watford West, England, assignors to Scammell Lorries Limited, Watford, West, England Application May 23, 1939, Serial No. 275,190
In Great Britain December 23, 1938

2 Claims. (Cl. 280—106)

This invention relates to motor road vehicles. It is well known to have coupled tractors and trailers in which a three-wheeled tractor is provided with mechanism adapted to co-operate with coupling means combined with a turn-table and a foldable wheeled frame supported at the front of the trailer so that when the tractor and trailer are coupled together to provide an articulated connection between them the wheeled frame will be folded so as to lift the wheels from the ground, and when the tractor is uncoupled from the trailer the wheeled frame will be lowered and locked in position to support the forward end of the trailer.

In such prior proposals the tractor is constructed essentially for such purpose, but it has been found desirable to adapt other motor road vehicles so that they will function as tractors for use with trailers to form articulated tractor-trailer vehicles, and the chief object of this invention is to provide the appropriate mechanism on a motor road vehicle chassis to achieve this desideratum. Another object of this invention is to provide an improved tractor for use with a trailer as beforesaid and in which the normal arrangement of back axle, chassis and other parts appropriate to a commercial lorry or van is maintained, whilst at the same time affording means to receive the usual or other suitable brake system appropriate to a tractor and trailer.

According to this invention means with, or for adapting, a motor road vehicle chassis for tractor purposes, so that a trailer may be coupled thereto, comprises a pair of angle section ramps adapted to abut against and to be welded to the upper and outer sides of the longitudinal main frame members of the vehicle, a pair of stiffening plates adapted to be welded along the inner sides of the said main frame members and also to be prolonged beyond the rear ends of the main frame members and to be welded at their rear ends to the ramps, a transverse frame member adapted to be fixed across the main frame members, and diagonal stays adapted to be welded across said transverse frame member and said stiffening plates.

In order that this invention may be clearly understood and readily carried into effect three sheets of drawings are appended hereto illustrating embodiments thereof, and wherein—

Fig. 3 is a detail sectional side elevation view to a larger scale showing the manner of securing the cross member of the conversion elements.

Fig. 4 is a sectional end view on the lines 4x—4x of Fig. 2 showing the preferred method of adapting the motor vehicle chassis for carrying the ramps, and Fig. 5 is a detail sectional end view showing the preferred manner of affixing a main cross member to the chassis in order to effect the desired conversion.

Figure 1:
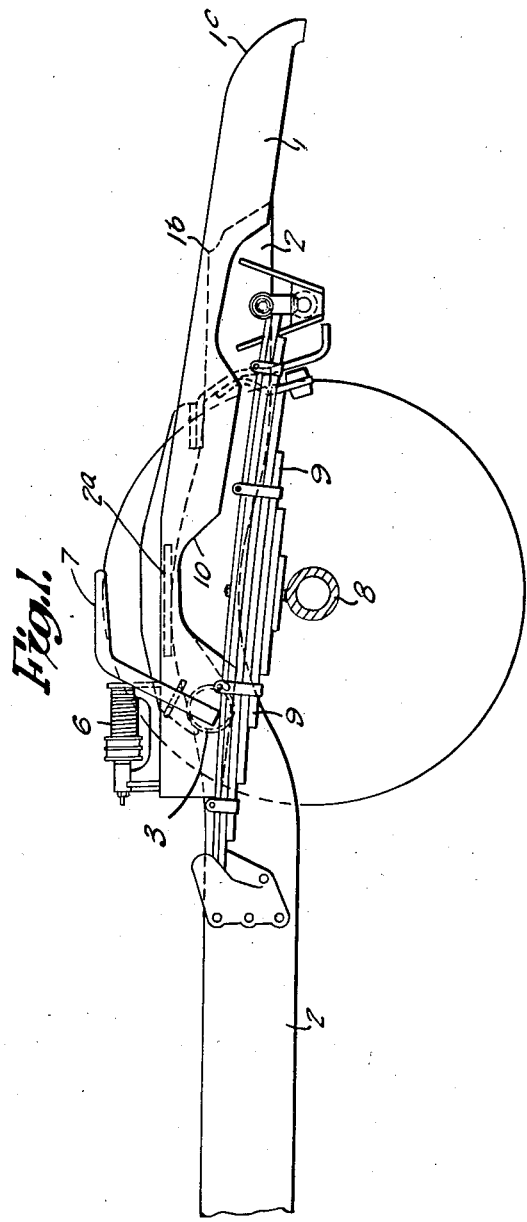
Fig. 1 is a broken side elevation view of the rear end of the tractor.
Figure 2:
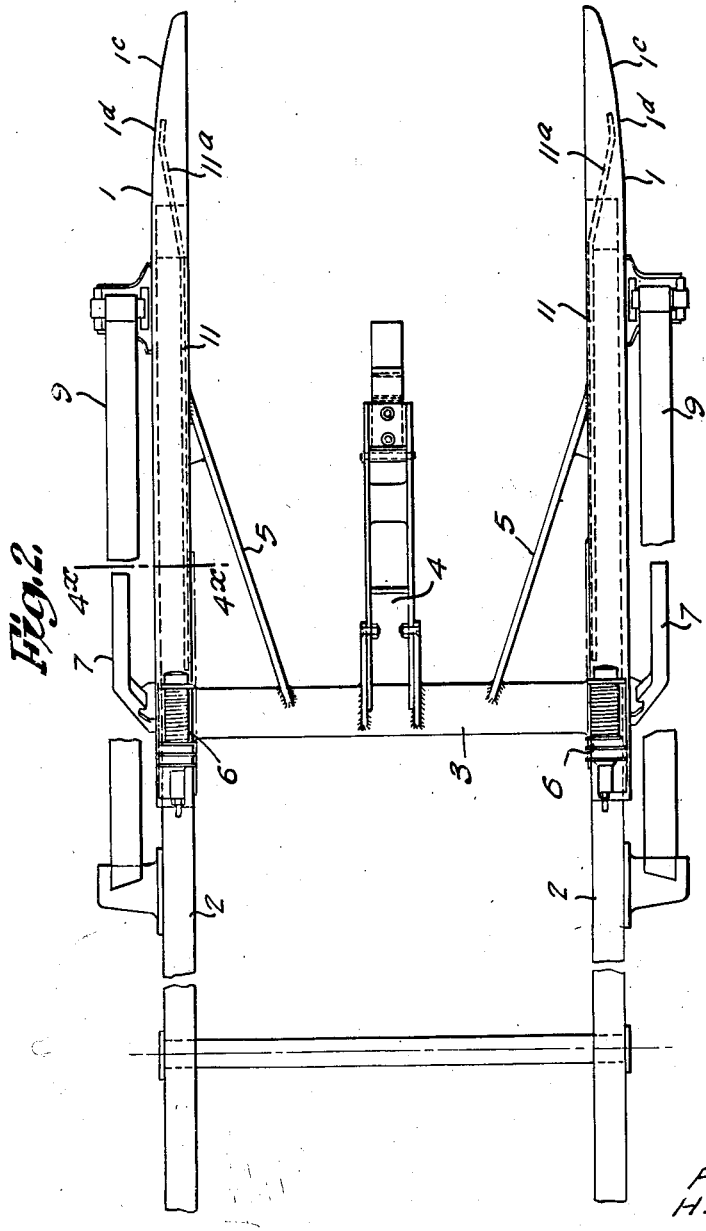
Fig. 2 is a plan view of Fig. 1.

Referring to the drawings the invention is shown applied to the chassis of an ordinary commercial lorry or van type of vehicle, in which a pair of L section bars forming ramps 1 are attached to the main frame members 2 of the motor road vehicle. Between these ramps is a substantial cross member 3 of tubular, channel or box form. Extending rearwardly from this cross member 3 and located between the two ramps, preferably midway between them, is a coupling mechanism by which the tractor is coupled to the trailer, this coupling mechanism being indicated generally by the reference numeral 4.

Between the side members or ramps on the tractor frame and the stout cross member 3 extend suitable diagonal stays 5 in the form of stout bars or plates welded at their forward ends to the cross member 3 adjacent to the rearwardly projecting coupling mechanism 4 mounted thereon. The rearward ends of the diagonal stays are welded or otherwise suitably fixedly secured to stiffening plates supplementing the side frame members 2 to make them of box section where they receive the ramps 1.

Suitably mounted on the ramps or side members of the tractor are spring buffers 6. These spring buffers locate rollers supported by a beam of the coupling mechanism of the trailer, when the rollers are engaged with the ramps 1 of the tractor when the tractor is backed into coupling engagement with a trailer. Suitable fixed horns such as the angle bars 7 are mounted on the ramps or side frame members of the tractor, and these horns are so arranged that their upper nearly horizontal limbs will engage over the axles of the said rollers on the coupling mechanism of the trailer when the tractor and trailer are coupled together to form an articulated tractor-trailer vehicle. These horns are welded or otherwise secured by their nearly upright limbs to the outer sides of the ramps or frame members of the vehicle at a position opposite or substantially opposite to the ends of the main cross member 3 extending between them. These horns and the spring buffers serve to hold the said rollers firmly in position on the ramps whilst the tractor and trailer portions of the vehicle are coupled together.

The mounting of the L section bars 1 is effected as shown in Fig. 4 in which a ramp section is indicated by the reference numeral 1a, the vertical limb of the cross section being abutted against the outer face of the chassis member 2 and the upper limb being abutted against a separator or space member 2a, which if of metal is welded on to the upper flange of the chassis member 2. These space members 2a afford extra depth of the trailing end of the chassis members 2, this being necessary to afford adequate clearance for the turntable and associated parts of the trailer from the normally arranged back axle 8, springs 9 and other contiguous parts of the tractor.

The ramps have bays 10 cut in their side flanges to afford clearance for the normally arranged shoes, shackles and plates of the springs 9. The space members 2a only extend a short distance along the chassis members 2, i. e., immediately beneath the turntable of the trailer when supported by the ramps. The ramps contact with their upper flanges with the rear corners of the chassis member 2 as at 1b and extend rearwardly beyond these corners, and bowed or inclined as at 1c at their rear ends to afford easy sliding engagement with the trailer rollers during coupling and uncoupling.

The rear ends of the chassis members 2 are stiffened, to enable them to take the extra load when a trailer is supported on the ramps. This is effected by welding across the inner edges of the channel section members 2 plates 11 (see Fig. 4) so that for a distance at their rear ends the chassis members 2 are of box-section. The main cross member 3 is secured in position by welding to the inner sides of the chassis members 2 and just in advance of the stiffening plates 11, a pair of plates 12 and welding to these plates the ends of the member 3 as shown in Fig. 5. It is preferred to prolong the plates 11 rearwardly beyond the frame members 2 and to bend these plates 11 outwardly rearwardly as at 11a and to secure their rear ends to the side webs of the angle section ramps as at 1d.

A convenient arrangement for readily converting a known make of chassis is to unite the end plates 11 to the front ends of the ramps so that a unitary substantially U-shaped main frame, i. e. the two ramps and the cross member 3, is available ready for attachment to the chassis.

We claim:

1. Means for converting the main chassis of a commercial road vehicle for adapting it for tractor purposes comprising a pair of angle section ramps adapted to abut against and to be welded to the upper and outer sides of the longitudinal main frame members of the vehicle, a pair of stiffening plates adapted to be welded along the inner sides of the said main frame members and also to be prolonged beyond the rear ends of the main frame members and to be welded at their rear ends to the ramps, a transverse frame member adapted to be fixed across the main frame members, and diagonal stays adapted to be welded across said transverse frame member and said stiffening plates.

2. In a motor road commercial vehicle the addition thereto of means converting it to a tractor vehicle, the said additional means comprising a pair of angle section ramps welded to the main frame members of the vehicle so as to extend rearwardly beyond the main frame members, a pair of stiffening plates welded to the inner sides of the main frame members so as to convert the rear ends of the main frame members to box section, said stiffening plates being united at their rear ends to the rear parts of the ramps, a transverse frame member united by welding to the inner sides of the main frame members of the chassis, and diagonal stays welded across said transverse frame member and the main frame members of the chassis, the welding of the diagonal stays to the chassis frame members being at points between the ends of the ramps.

PERCY GARIBALDI HUGH.
HENRY THORNTON BAKER.